J. W. McCONEGHY.
WEIGHING SCOOP.
APPLICATION FILED MAR. 26, 1910.
977,668.
Patented Dec. 6, 1910.
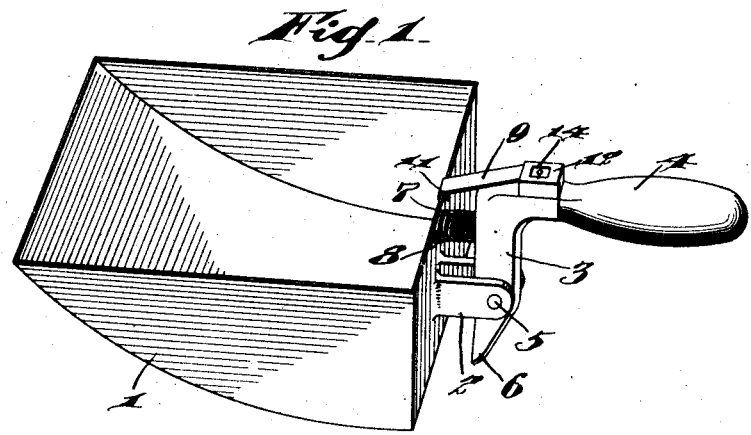
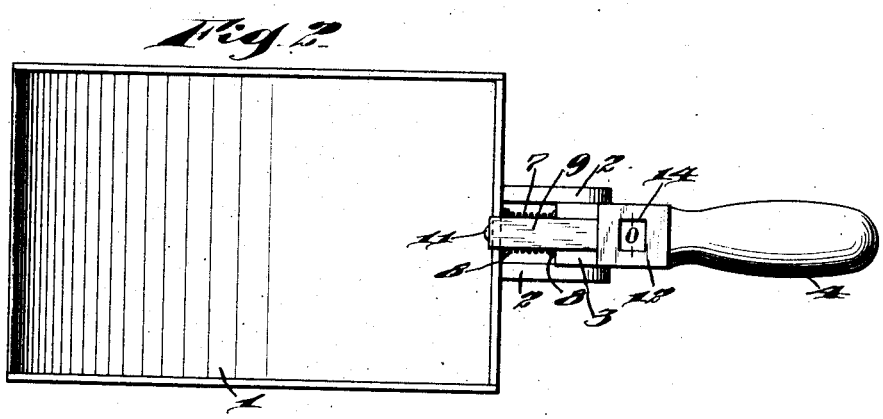
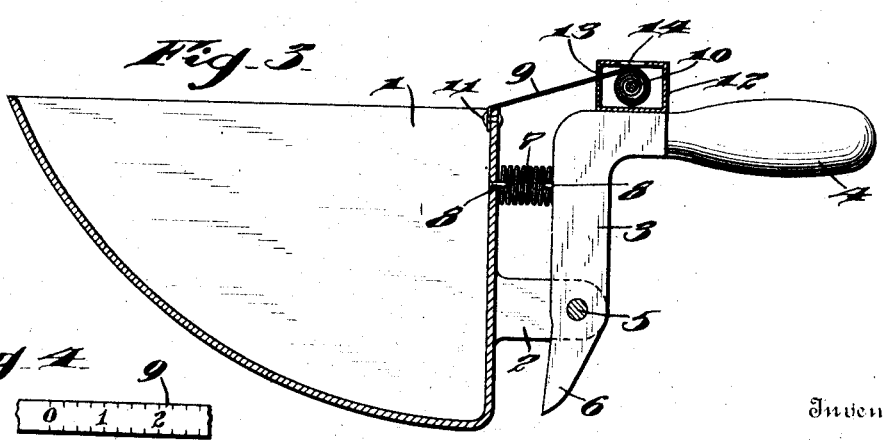
Witnesses
Inventor
John W. McConeghy,
By Joshua R. H. Potts,
Attorney

UNITED STATES PATENT OFFICE.

JOHN W. McCONEGHY, OF PHILADELPHIA, PENNSYLVANIA.

WEIGHING-SCOOP.

977,668.  Specification of Letters Patent.   Patented Dec. 6, 1910.

Application filed March 26, 1910.  Serial No. 551,612.

*To all whom it may concern:*

Be it known that I, JOHN W. MCCONEGHY, a citizen of the United States, residing at Philadelphia, in the county of Philadelphia and State of Pennsylvania, have invented certain new and useful Improvements in Weighing-Scoops, of which the following is a specification.

My invention relates to improvements in weighing scoops, the object of the invention being to provide a scoop with improved mechanism for indicating the weight of the contents of the scoop, and is especially designed for use on scoops that are employed in grocery stores, and the like, for conveying sugar, flour, coffee, etc., from the bins to the scales, enabling the grocery man to very accurately pick up in the scoop, just the amount of material desired.

A further object is to provide a simple, comparatively inexpensive scoop of this character in which the handle of the scoop is pivotally connected to the scoop proper, and a spring provided between the handle and the scoop which is expanded by the pivotal movement of the scoop to indicate the weight of the contents of the scoop.

With these and other objects in view, the invention consists in certain novel features of construction and combinations and arrangements of parts as will be more fully hereinafter described and pointed out in the claims.

In the accompanying drawings: Figure 1, is a perspective view illustrating my improvements. Fig. 2, is a top plan view. Fig. 3, is a view in longitudinal section, and Fig. 4, is a fragmentary view in detail, of my improved tape.

1, represents the scoop proper, which is of the ordinary shape, and is provided at its end with perforated ears 2, pivotally secured to a downwardly projecting arm 3, on the handle 4. This arm 3 is disposed normally parallel with the end wall of the scoop, and is provided with a perforation at a point removed from its lower end, and a pin 5 is positioned through this perforation and through the perforations in ears 2, to pivotally connect the handle and scoop. The lower end 6, of the arm constitutes a lug which lies in the path of movement of the scoop, and limits the pivotal movement of the scoop.

A coiled spring 7 is located between arm 3 and scoop 1, and is secured at its ends to the arm 3 and the scoop 1, by means of staples 8, or other suitable fastening devices. This spring 7 is expanded by the pivotal movement of the scoop, caused by the weight of material in the latter, and this movement of the scoop draws a tape 9 from off a spring reel 10. The free end of this tape 9 is secured to the scoop, as shown at 11, and the reel 10 is supported in a box 12 on top of handle 4. This box 12 has an opening 13 therein for the passage of the tape, and an opening 14 through which the tape may be viewed. This tape, when the scoop is empty, is so marked that a cipher registers with the opening 14. As the scoop picks up the material, the weight of the material against the action of spring 7, draws the tape 9 from off of reel 10, and the characters on the scale of the tape, will indicate at the opening 14, the weight of the material in the scoop. Hence, grocery men may tell at the bin before walking to the scales the quantity of material they have in the scoop, and thus saving themselves many trips back and forth before getting just the required amount of material in the scale.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a device of the character described, the combination with a scoop, perforated ears on the scoop, of a handle, a downwardly projecting arm on the handle pivotally secured between its ends, between said perforated ears, the lower end of said arm constituting a stop to limit the pivotal movement of the scoop, a spring between the arm and scoop, and located above the pivotal connection between the handle and the scoop and secured to both, and a measuring tape connecting the handle and scoop, substantially as described.

2. In a device of the character described, the combination with a scoop, perforated ears on the scoop, of a handle, a downwardly projecting arm on the handle pivotally secured between its ends, between said perforated ears, the lower end of said arm constituting a stop to limit the pivotal movement of the scoop, a spring between the arm and scoop, and located above the pivotal connection between the handle and the scoop and secured to both, a box on said handle having openings in its top and end, a spring reel in said box, a measuring tape secured at one end to said spring reel, exposed through said opening in the top of the box, and extending through the opening in the end of the box and secured to the scoop, substantially as described.

In testimony whereof I have signed my name to this specification in the presence of two subscribing witnesses.

JOHN W. McCONEGHY.

Witnesses:
R. H. KRENKEL,
C. E. POTTS.